Figure 1:
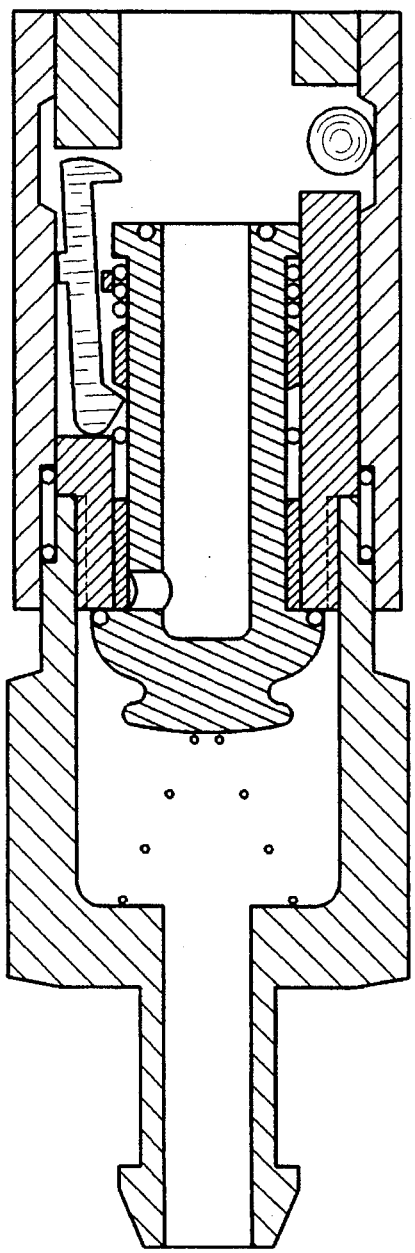

United States Patent [19]

Engdahl

[11] Patent Number: 5,547,166

[45] Date of Patent: Aug. 20, 1996

[54] HOSE COUPLING FOR COMPRESSED AIR

[76] Inventor: Björn Engdahl, Krokslätts Parkgata 58C, S-431 58 Mölndal, Sweden

[21] Appl. No.: 416,825

[22] PCT Filed: Oct. 14, 1993

[86] PCT No.: PCT/SE93/00839

§ 371 Date: Apr. 17, 1995

§ 102(e) Date: Apr. 17, 1995

[87] PCT Pub. No.: WO94/09304

PCT Pub. Date: Apr. 28, 1994

[30] Foreign Application Priority Data

Oct. 16, 1992 [SE] Sweden ................... 9203040

[51] Int. Cl.⁶ .................................................. F16L 37/28
[52] U.S. Cl. .................... 251/149.6; 285/313; 285/316
[58] Field of Search ............................. 285/313, 316, 285/317; 251/149.6

[56] References Cited

U.S. PATENT DOCUMENTS 2,888,278  5/1959  Torres et al. ...................... 285/313
2,952,482  9/1960  Torres ................................ 285/313
4,685,490  8/1987  Medvick ........................ 137/614.03
4,982,761  1/1991  Kreczko et al. .................. 285/313

FOREIGN PATENT DOCUMENTS 1104697  2/1968  United Kingdom ................. 285/316

Primary Examiner—A. Michael Chambers
Attorney, Agent, or Firm—D. Peter Hochberg; Mark Kusner; Michael Jaffe

[57] ABSTRACT

The invention relates to a hose coupling for compressed air having a safety locking device. The safety locking device comprises a disconnectable male member which is caught by locking members in a female member until the overpressure in the hose and the tool has disappeared, after which the male member is released, and the occurrence of a loud bang is prevented.

8 Claims, 2 Drawing Sheets

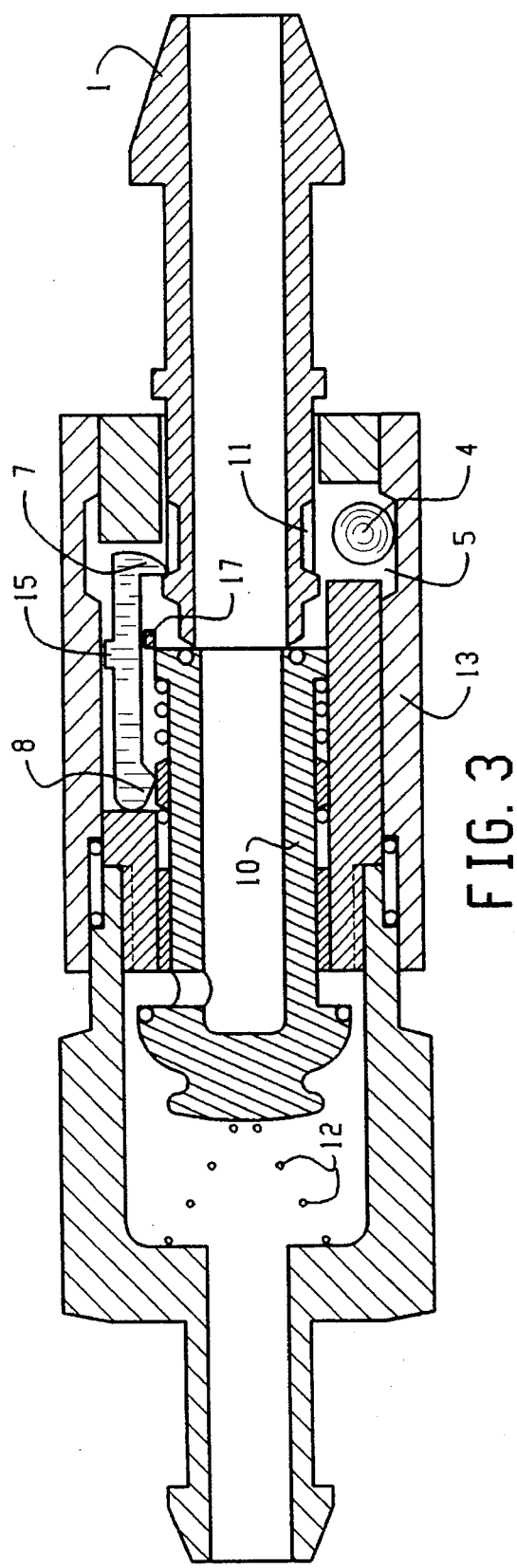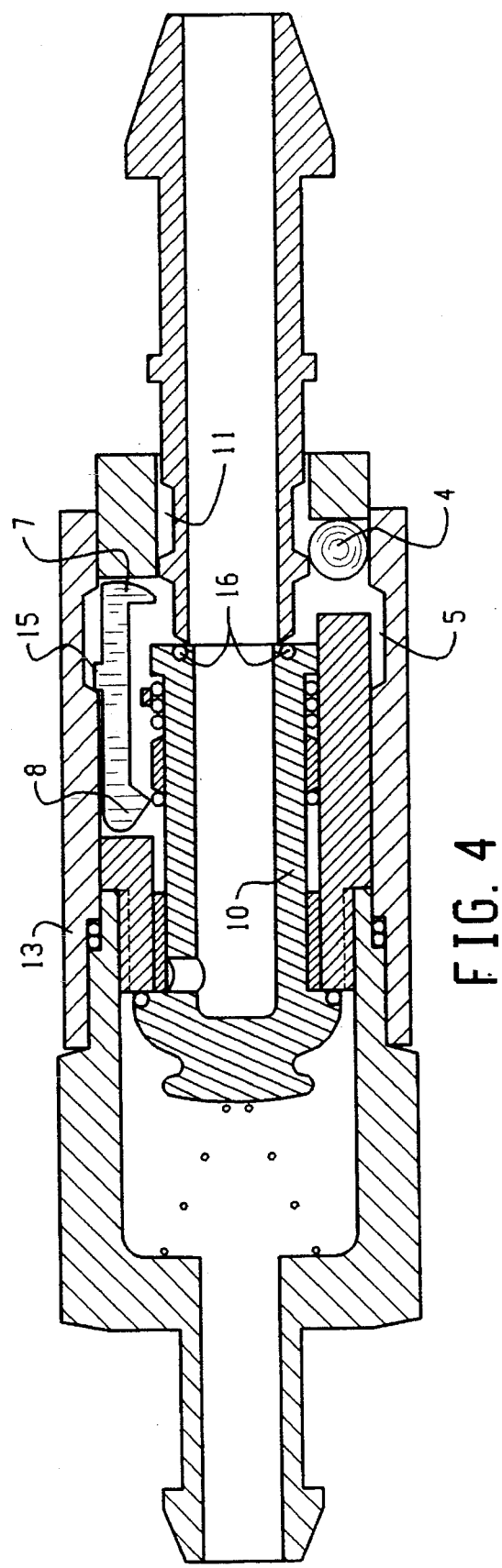

HOSE COUPLING FOR COMPRESSED AIR

It is well-known that by the use of pneumatic tools it frequently occurs that one has to remove the tool or perhaps to change to any other tool. The hose coupling which then connects the pneumatic tool with a hose from the pneumatic system is then released. By the release arises then a very high bang and the hose together with the hose coupling nipple move backwards with a very big power. This happens due to the overpressure in the hose leading to the tool is discharged unrestrictedly. It is experienced by many people as tremendous unpleasant that the hose with its nipple rushes away vigorously and uncontrolled with a big bang. Primarily within the industry, where the tools really have a high working pressure and where changes of tools often occur. Unlike other safety systems against this unpleasant effect this construction is designed so, that the existing standardized series of equipment can be used, and to meet the requirement that only one-hand grip shall be needed for quick and uncomplicated changes.

The purpose of the construction is thus to prevent the unpleasant bang that is created at changes of tools and to lock the nipple inside the coupling during the time the overpressure in the hose disappears. It is also important that the construction is adapted to already existing standardized series of equipment. The change of the potential tool shall also be just as fast and easy as at already existing standardized series.

Figure 2:
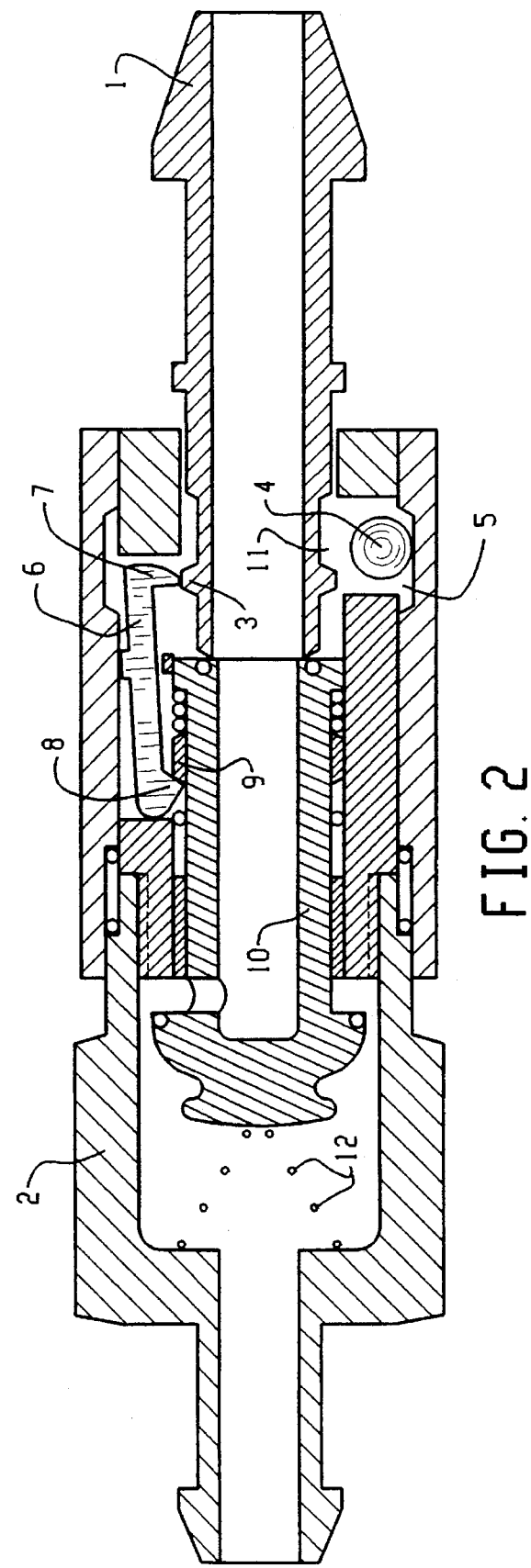

The invention will be described hereinafter with reference to the enclosed figures wherein FIG. 1 shows the hose coupling totally disconnected.
FIG. 2 shows the hose coupling during connection.
FIG. 3 shows the hose coupling totally connected.
FIG. 4 shows the hose coupling during disconnection.

The male member (1) is inserted into the coupling (2). Then the front cam (3) on the male member (1) engages the ball (4) and pushes the ball away due to the fact that there is space downwards (5, the spline). After the male member cam (3) has passed the ball, the so called locking pawl's front cam (7) will be forced upwards, at the same time as the rear cam (8) is pressed downwards. A so called seesaw-effect has arisen. The rear cam (8) then grips an axially resilient ring (9). When the male member (1) now is pressed inwards, the entire nonreturn valve (10) at the same time is pressed backwards, but the axially resilient ring (9) is still kept fixed by the locking pawls. The more the male member is pushed in, the higher resilient pressure is built up in the ring (9), which is retained by the rear cam (8) on the locking pawl. When the ring (9) now has an axial resilient pressure backwards, it strives to press the rear cam (8) upwards and the front cam (7) downwards. This can not happen before the male member is far enough inside, so that the front cam (7) can fall down into the spline (11) in the male member. At the same time as the front cam falls down in the spline, the resilient ring (9) is pushed backwards and urges the rear cam (8) upwards. The locking is now completed. See FIG. 3.

The front cam (7) now lies in the spline (11) and retains the male member (1). The male member is now locked and strives backwards due to the nonreturn valve (10), which now is open and spring-loaded (12) and presses the male member backwards. The locking pawl (6) is now subjected to an inverted seesaw-effect. The front cam (7) is now pressed upwards and the rear cam (8) is pressed downwards. But as shown in FIG. 3 we can see that the resilient ring (9) lies in such a position that the cams of the locking pawl can not move in any direction. The male member is locked. In order now to free the male member (see FIG. 4) from the pneumatic system, the sleeve (13) that surrounds the coupling now must be pulled backwards. The sleeve (13) has a resilient resistance when it is pressed backwards. When the sleeve (13) now is pulled backwards, the turned out spline (5) also will move backwards. The spline (5) will be right in front of the upper stud (15) on the locking pawl. The result of this now will be that the tendency of the front cam (7) to strive upwards is made possible due to the spline (5) in the sleeve being Just in front of the upper stud (15), when the sleeve is pulled backwards. At the same time as the sleeve is pulled backwards, the ball (4) is locked in the male member spline (11). Looking at FIG. 3 and imagining that the sleeve is pulled backwards, the space (the spline, 5) for the ball disappears at the same time as it presses the ball somewhat up into the male member spline (11). Soon afterwards the turned out spline (5) will be right in front of the upper stud (15), thereby enabling disconnection of the grip on the male member. See FIG. 4. At the disconnection the male member moves backwards at very big force and the nonreturn valve (10) closes. The male member stops moving when the ball has reached the bottom of its spline. The male member can not move further out. Note! The sleeve is now kept in a pulled-back position. The male member is also disconnected from the sealing O-ring (16). In this stage the overpressure left in the hose and tool may leak out, silently and at controlled rate. When the overpressure has disappeared, the sleeve (13), that springs, is again allowed to move forward. When the sleeve lies in its front position, also the turned out spline (5) lies over the ball and the ball releases its grip on the male member.

I claim:

1. A hose coupling comprising:
   a male member;
   a female member dimensioned to receive said male member, said female member comprising:
   (i) an axially displaceable slide having a spring-loaded ring, said slide movable to a first position to turn off the flow of fluid through the coupling, and movable to a second position to open the flow of fluid through the coupling, wherein said slide is movable to the second position by insertion of said male member into said female member,
   (ii) at least one pawl means pivotable about a pivot surface, and having first and second levers, said first lever engageable with said male member to lock said male member to said female member, and said second lever engageable with said spring-loaded ring to hold said male member in a sealing contact with said female member,
   (iii) at least one locking member engageable with said male member to lock said male member to said female member, and
   (iv) an axially displaceable sleeve enclosing said female member and movable to a first position to disengage said first lever from said male member, disengage said second lever from said spring-loaded ring, and engage said locking member with said male member, and movable to a second position to disengage said locking member from said male member.

2. A hose coupling according to claim 1, wherein said at least one pawl means includes a stud engageable with said sleeve.

3. A hose coupling according to claim 1, wherein said sleeve includes a recess for receiving said locking member, to disengage said locking member from said male member.

4. A hose coupling according to claim 1, wherein said locking member engages said male member while said first lever simultaneously disengages from said male member.

5. A hose coupling according to claim 1, wherein each said first and second levers has a cam portion.

6. A hose coupling according to claim 1, wherein said slide is in said second position to open the flow of fluid through said coupling to allow any overpressure in the coupling to be released, when said locking member engages with said male member.

7. A hose coupling according to claim 1, wherein said locking member is a ball.

8. A hose coupling according to claim 1, wherein said pivot surface is a nib.

* * * * *